United States Patent [19]

Lowery, Jr.

[11] Patent Number: 5,804,082
[45] Date of Patent: Sep. 8, 1998

[54] CONTAINER FOR SEPARATING AND DISPENSING FLUIDS

[76] Inventor: James D. Lowery, Jr., 2525 Latimer Ave., Jackson, Miss. 39209

[21] Appl. No.: 751,117

[22] Filed: Nov. 15, 1996

[51] Int. Cl.⁶ ............................ B01D 37/00; B01D 17/028
[52] U.S. Cl. .......................... 210/800; 210/94; 210/464; 210/515; 210/518; 210/532.1; 210/540; 210/539; 222/129
[58] Field of Search ...................................... 222/129, 478, 222/479; 210/94, 514, 515, 516, 518, 744, 800, 464, 532.1, 540, 539

[56] References Cited

U.S. PATENT DOCUMENTS

| | | |
|---|---|---|
| 250,798 | 12/1881 | Fusner . |
| 844,929 | 2/1907 | Gilbert . |
| 959,711 | 3/1910 | Burch et al. . |
| 982,328 | 1/1911 | Wheeler . |
| 1,121,993 | 12/1914 | Eichler . |
| 1,488,865 | 4/1924 | Castor . |
| 1,598,230 | 8/1926 | Zirbel . |
| 2,544,070 | 3/1951 | Daniels . |
| 2,551,450 | 5/1951 | Minton . |
| 2,799,437 | 7/1957 | Jepson ..................................... 222/481 |
| 4,416,396 | 11/1983 | Ward . |
| 4,703,871 | 11/1987 | Broker . |
| 4,881,652 | 11/1989 | Schiemann . |
| 4,994,186 | 2/1991 | Hays ........................................ 210/464 |
| 5,022,547 | 6/1991 | Spangler et al. . |
| 5,197,513 | 3/1993 | Todd et al. . |

*Primary Examiner*—Robert Popovics
*Attorney, Agent, or Firm*—John F. Sieberth; R. Andrew Patty II

[57] ABSTRACT

Described are novel containers adapted to separate and dispense two or more fluids of different densities, and novel methods of selectively separating and dispensing two or more fluids of different densities. In one embodiment, the container of this invention comprises (a) a top container portion defining at least one aperture through which fluid may flow, (b) a bottom container portion, (c) a phase separator between the top container portion and the bottom container portion, the separator and the top container portion defining an upper fluid chamber, the separator and the bottom container portion defining a lower fluid chamber, the chambers being in fluid communication with one another, and (d) a conduit extending from the lower chamber to the exterior of the container in such a way that, when the container is positioned for dispensation of fluid through the aperture, the fluid of greater density is substantially trapped within the lower chamber to permit concurrent separation of the liquids and dispensation of either the fluid of lesser density from the upper fluid chamber or the fluid of greater density from the lower fluid chamber.

26 Claims, 4 Drawing Sheets

CONTAINER FOR SEPARATING AND DISPENSING FLUIDS

TECHNICAL FIELD

This invention relates to fluid containers adapted to separate and dispense two or more fluids of different densities.

BACKGROUND

Gasoline and other fluid materials are often stored in cans, jugs, tanks and other containers which provide a way in which the user may dispense the fluid from the container when desired. Often, the desired fluid stored in these containers becomes contaminated with undesirable fluids as, for example, when gasoline in a container becomes contaminated with water from condensation or other sources. Although, in typical circumstances, these fluids exist in separate phases on account of their different densities, heretofore containers of such fluids have required the user to dispense at least some of both fluids at the same time, or have required substantial dispensation of one fluid before another fluid could be dispensed.

Thus, a need exists for a way to selectively dispense, from the same container, two or more fluids having different densities, without requiring substantial dispensation of one fluid before the other fluid may be dispensed.

SUMMARY OF THE INVENTION

The present invention is deemed to fulfill this need by providing, among other things, a container adapted to separate and dispense two or more fluids of different densities, the container comprising (a) a top container portion defining at least one aperture through which fluid may flow, (b) a bottom container portion, (c) a phase separator between the top container portion and the bottom container portion, the separator and the top container portion defining an upper fluid chamber, the separator and the bottom container portion defining a lower fluid chamber, the chambers being in fluid communication with one another, and (d) a conduit extending from the lower chamber to the exterior of the container in such a way that, when the container is positioned for dispensation of fluid through the aperture, the fluid of greater density is substantially trapped within the lower chamber to permit concurrent separation of the liquids and dispensation of either the fluid of lesser density from the upper fluid chamber or the fluid of greater density from the lower fluid chamber. Preferably, the separator comprises a baffle having a perimeter, the baffle being sealably attached along at least a substantial portion of the perimeter to one or more substantially vertical interior surfaces of the container. In a particularly preferred embodiment, the baffle is substantially flat and disposed at an angle from horizontal (preferably from about 5° to about 15°) and further comprises an upper baffle portion and a lower baffle portion, the lower baffle portion at least in part defining a passageway between the chambers for fluid communication between the chambers. In this particularly preferred embodiment, the upper baffle portion and the bottom container portion trap the fluid of greater density in the lower chamber during normal dispensation of the fluid of lesser density from the upper fluid chamber.

Another embodiment of this invention is a method of selectively separating and dispensing two or more fluids of different densities, the method comprising placing the fluids in a container, the container comprising (a) a top container portion defining at least one aperture through which fluid may flow, (b) a bottom container portion, (c) a phase separator between the top container portion and the bottom container portion, the separator and the top container portion defining an upper fluid chamber, the separator and the bottom container portion defining a lower fluid chamber, the chambers being in fluid communication with one another, and (d) a conduit extending from the lower chamber to the exterior of the container to permit controlled dispensation of the fluid of greater density from the lower fluid chamber, and positioning the container for dispensation of fluid so that the fluid of greater density is substantially trapped within the lower chamber to permit concurrent separation of the liquids and dispensation of either the fluid of lesser density from the upper fluid chamber or the fluid of greater density from the lower fluid chamber.

These and other embodiments and features of the invention will become still further apparent from the ensuing description, appended claims and accompanying drawings.

BRIEF DESCRIPTION OF THE DRAWINGS

In each of the above figures, like numerals are used to refer to like or functionally like parts among the several figures.

DETAILED DESCRIPTION OF THE INVENTION

As may now be seen, this invention provides for the selective dispensing of fluids of different densities from the same container. The invention also enables the filtering of contaminate fluids from more desirable fluids where the respective fluids have different densities.

Figure 1:
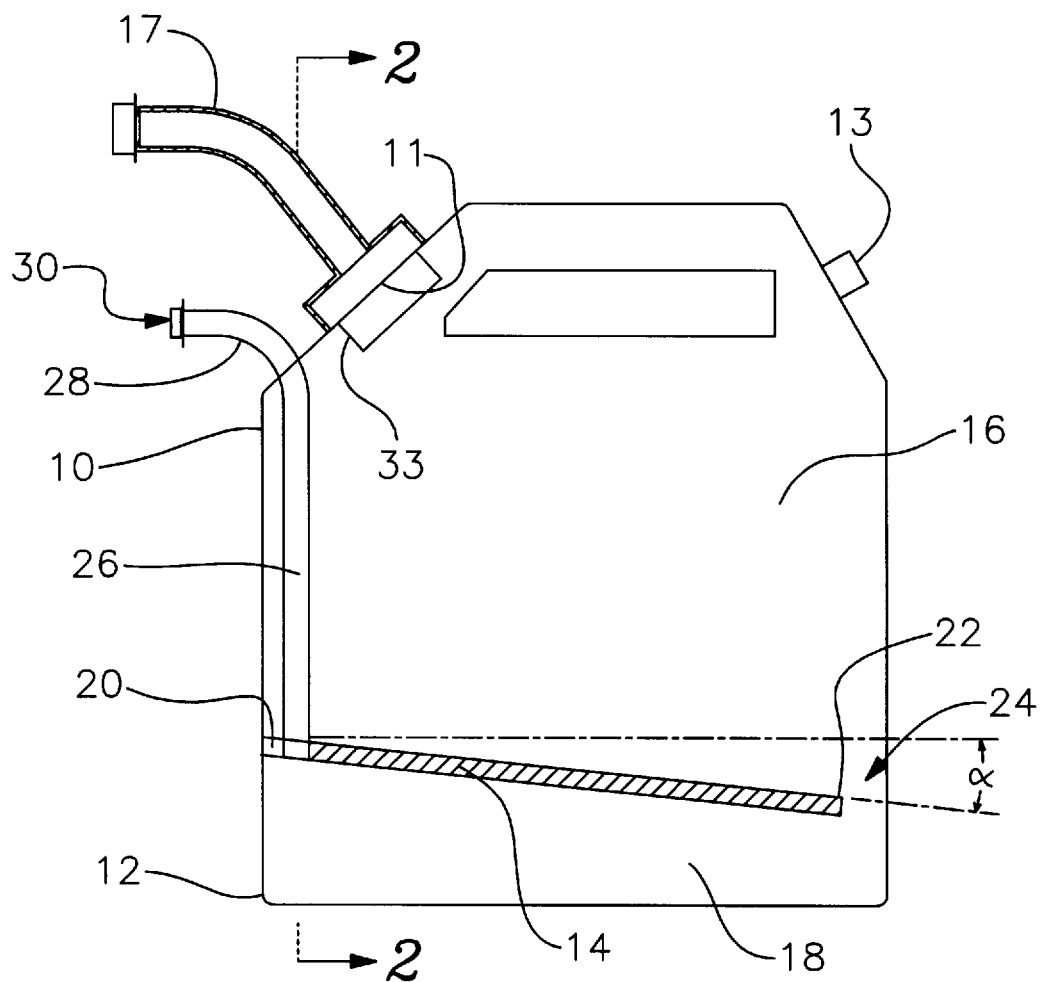
FIG. 1 is a side view in cross section illustrating an embodiment of this invention.
Figure 2:
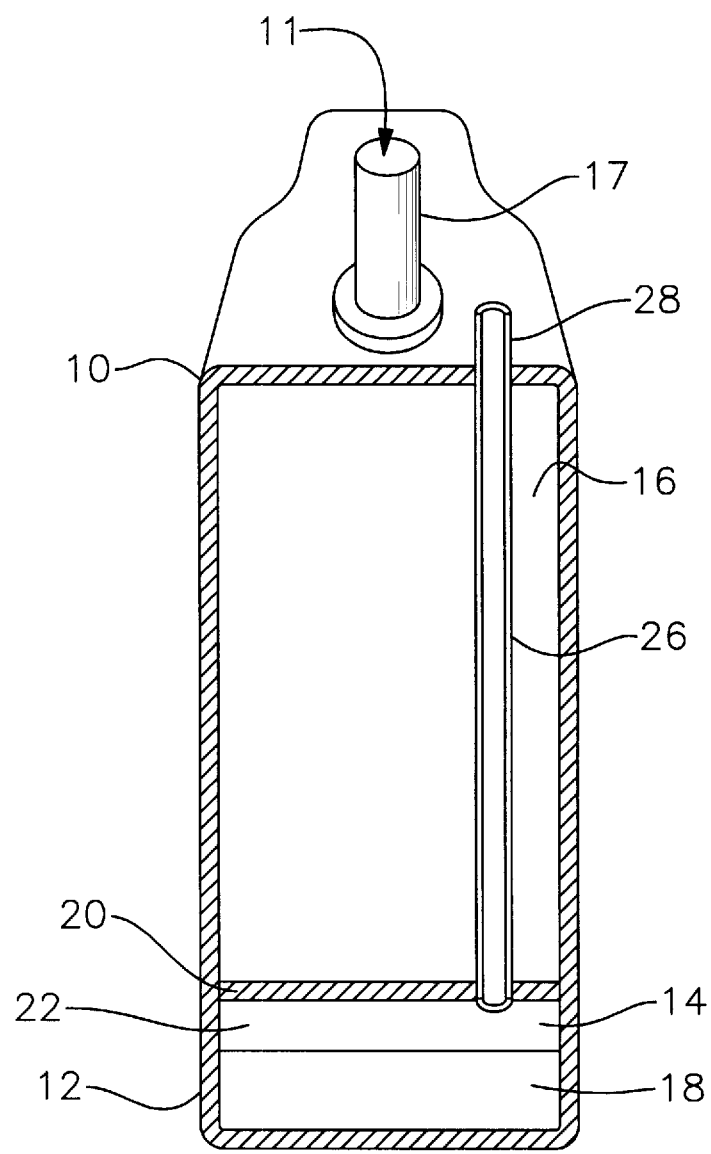
FIG. 2 is another side view in cross section of the container of FIG. 1.
Figure 3:
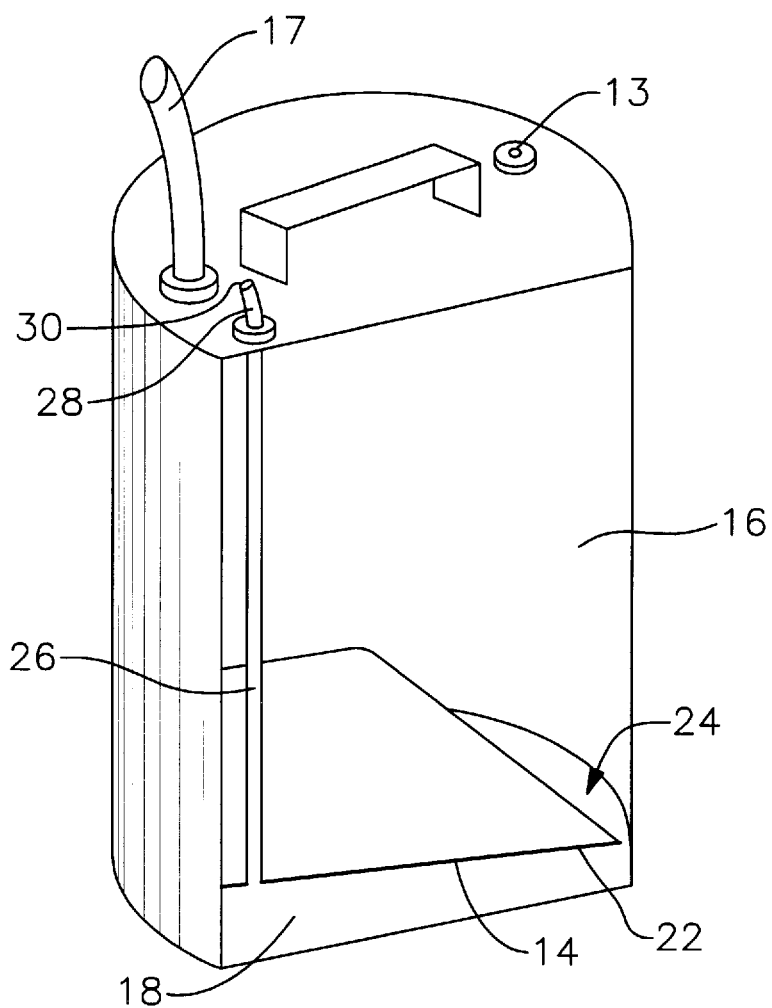
FIG. 3 is a perspective view partially cut away illustrating another embodiment of this invention.

Referring now to the figures, FIGS. 1 through 3 illustrate containers of this invention. FIGS. 1 and 2 illustrate different cross-sections of a container, the container being comprised of a top container portion 10, a bottom container portion 12, and a phase separator within the container in the form of a baffle 14 between portions 10 and 12, baffle 14 and top container portion 10 defining an upper fluid chamber 16. Top container portion 10 defines a spout aperture 11 through which fluid may flow, and an air ventilation aperture 13 which permits air to more easily displace exiting fluid during the pouring of fluid from the container. A spout 17 is also provided at aperture 11 to facilitate the dispensing of fluid from the container. Baffle 14 and bottom container portion 12 also define a lower fluid chamber 18.

In the container depicted in FIGS. 1 and 2, baffle 14 is rectangular in shape and has a perimeter defined by the four sides of the rectangle. Baffle 14 is sealably attached along three sides of the perimeter to three substantially vertical interior surfaces of the container. Preferably, and as depicted, baffle 14 is also substantially flat at least on its upper surface and disposed at an angle α downwardly from horizontal, angle α being preferably within the range of from about 5° to about 15°. This angular disposition of baffle 14 provides efficient incentive for the more dense fluid within the container to proceed into lower chamber 18 while optimizing the available volumes of both chambers. Baffle 14 includes an upper baffle portion 20 and a lower baffle portion 22, lower baffle portion 22 at least in part defining a passageway 24 between chambers 16 and 18 for fluid communication therebetween. In this way, upper baffle portion 20 and bottom container portion 12 trap the fluid of greater density in lower chamber 18 during normal dispensation of the fluid of lesser density from upper chamber 16 through spout aperture 11.

A conduit in the form of a hollow tube 26 is attached to the container and extends from lower chamber 18 through upper chamber 16 and top container portion 10 to the exterior of the container to permit controlled dispensation of fluid from lower chamber 18. A terminal end 28 of tube 26 extends outside of the container and includes a removable plug or cap 30 for controlling the flow of liquid from lower chamber 18 through tube 26. This illustrates another feature of this invention, i.e., when spout aperture 11 is capped, the fluid of greater density trapped in lower chamber 18 may be separately dispensed through tube 26 without removing the fluid in upper chamber 16.

FIG. 3 illustrates another embodiment of this invention wherein the container is cylindrical rather than rectangular in horizontal cross-section. In alternative embodiments as illustrated here, the container does not have a rectangular box shape, and the number of sides of the container to which the baffle attaches may vary. For example, if the container is cylindrical, as illustrated in FIG. 3, there may be no particular side to which the baffle attaches. Rather, the baffle attaches to the interior surface in such a way that, when the container is moved into a normal pouring position, the container and the baffle trap water in the lower chamber. It is noteworthy that the containers of this invention are also capable of trapping solid debris within their lower chamber, when the debris is more dense than the surrounding fluid and small enough to pass from the upper chamber to the lower chamber and between the baffle and an adjacent container wall. This feature prevents such solid debris from being unwittingly dispensed from the upper chamber. Once the container is empty, the solids can be removed by placing a small amount of fluid into the container and positioning the container so that the fluid and debris in the lower chamber pass up into the upper chamber, to then be removed from the container by pouring out the contents of the upper chamber.

FIG. 3 illustrates only one of a number of other shapes and/or sizes which may characterize a container of this invention, so long as the functionality of the device in accordance with this invention is not hindered by the choice of shape or size. Likewise, containers of this invention may be fabricated from a variety of materials including, for example, metals, metal alloys, glass, and plastics, with plastics being preferred for their combined features permitting economical fabrication and potential transparency, if desired. In a preferred embodiment of the invention, at least a portion of the container is sufficiently transparent to permit inspection of the color of the liquid contents just above and just below the separator. In this way, a user may visually inspect the container to determine the level of phase separation between different fluids within the container, and to determine whether that separation is above or below the phase separator within the container.

Figure 4A:
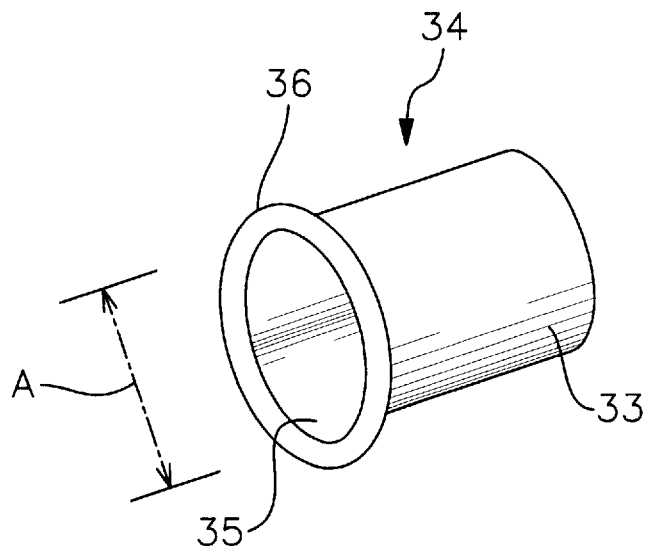
FIG. 4A is a view in perspective of an adapter of this invention.
Figure 4B:
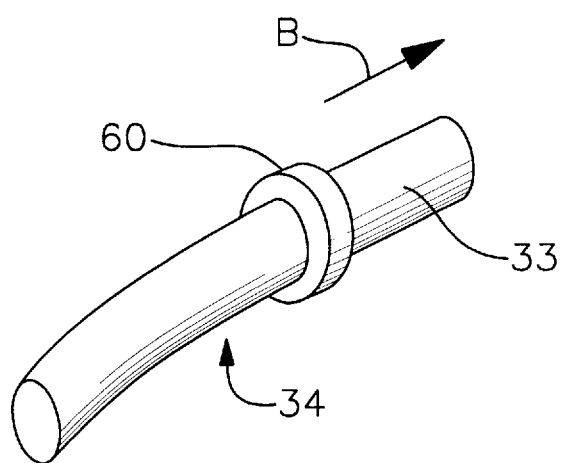
FIG. 4B is a view in perspective of another adapter of this invention.

Containers of this invention may also include an adapter removably attached to the container at the spout aperture through which the container content is dispensed. Although this adapter is somewhat less preferred under normal circumstances, it can serve as an efficient supplemental separator of fluids having different densities when the relative quantities of the different fluids do not substantially favor the less dense fluid. Such an adapter is depicted in FIGS. 1 and 4A–4B, where a hollow shaft 34 includes a first portion 33 which extends into the container during use, and a second portion 35 having an outer diameter illustrated by line A which is less than the diameter of aperture 11 by only so much as is required to permit shaft 34 to easily slide through aperture 11. A radially extending flange 36 extends from the outer surface of second portion 35 and is annularly disposed around the longitudinal axis of shaft 34 so that the combined outer diameter of second portion 35 and flange 36 in radial cross-section is greater than the diameter of aperture 11. In this way, when second portion 35 is disposed within aperture 11 and flange 36 abuts the container, first portion 33 axially extends into the container by a distance sufficient, during dispensation of fluid from the container, to concurrently substantially block the flow of the fluid of greater density through aperture 11 while permitting the flow of the fluid of lesser density through aperture 11. When used in conjunction with a threaded cap 60, flange 36 also provides a sealing engagement between the shaft and the container, to prevent fluid leakage at the aperture. A variety of other configurations may be used to provide the sealing engagement between the container and the portion of the shaft extending through the aperture. A common alternative is illustrated in FIG. 4B, where shaft 34 extends through cap 60, and first portion 33 has a diameter which gradually increases as it extends into the container in the direction of line B so that, when shaft 34 is pulled along its longitudinal axis through cap 60, at some point along shaft 34, the outer surface of shaft 34 meets cap 60 and is pulled into sealing engagement with cap 60. All such various configurations for sealing the shaft to the container at the aperture are within the scope of this invention, so long as the container and the shaft function as described herein. In addition, when used, flange 36 may be disposed anywhere along the longitudinal axis of shaft 34, as long as the fluid separating characteristics as described herein are preserved. Thus, as can now be appreciated, the adapter may be configured to also function as a spout by extending the second portion of the shaft outside the container by an appreciable distance.

Although the dimensions of this adapter will vary depending upon the shape and volume of the container, the distance by which the hollow shaft of the adapter axially extends into the container when the shaft is disposed within the aperture and the flange abuts the container will preferably be in the range of from about 1 to about 3 inches.

Of course, a wide variety of objects may serve as the cap or plug which is used on the conduit in containers of this invention. Such object may include, for example, threaded caps, cylindrical plugs, spring clamps, vice clamps, and the like. Typically, both the aperture and the conduit of this invention will have caps, spouts, and/or other plugs for controlling the flow of fluid out of their respective chambers. Those skilled in the art will also appreciate that the conduit of this invention through which fluid flows from the lower chamber may be disposed within the container, attached to the container, or integrated into the container in a variety of ways, with the proviso that the conduit must be disposed in such a way that, when the container is positioned for dispensation of fluid through the aperture, the fluid of greater density is substantially trapped within the lower chamber to permit concurrent separation of the liquids and dispensation of either the fluid of lesser density from the upper fluid chamber (through the aperture) or the fluid of greater density from the lower fluid chamber (through the conduit).

This invention is susceptible to considerable variation in its practice. Therefore, the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A method of separating and selectively dispensing two liquids of different densities, the method comprising placing the liquids in a container, the container comprising
   (a) a top container portion defining at least one aperture through which liquid may flow,
   (b) a bottom container portion,
   (c) a phase separator between the top container portion and the bottom container portion, the separator and the top container portion defining an upper liquid chamber, the separator and the bottom container portion defining a lower liquid chamber, the chambers being in liquid communication with one another, and
   (d) a conduit extending from the lower chamber to an exterior of the container above the top container portion thereby placing the lower chamber in liquid communication with the exterior of the container to permit controlled dispensation of the liquid of greater density from the lower chamber, and
   positioning the container for dispensation of liquid so that the liquid of greater density is substantially trapped within the lower chamber to permit concurrent separation of the liquids and dispensation of either the liquid of lesser density from the upper chamber through the aperture or the liquid of greater density from the lower chamber through the conduit.

2. A method according to claim 1 wherein the conduit comprises a hollow tube integral with or attached to the container, one end of the tube extending outside of the container and including a removable plug or cap for controlling the flow of liquid from the lower chamber through the tube.

3. A method according to claim 2 wherein the separator comprises a baffle having a perimeter, the baffle being sealably attached along at least a substantial portion of the perimeter to one or more substantially vertical interior surfaces of the container.

4. A method according to claim 3 wherein the baffle is substantially flat and disposed at an angle from horizontal and further comprises an upper baffle portion and a lower baffle portion, the lower baffle portion at least in part defining a passageway between the chambers for liquid communication between the chambers, and wherein the upper baffle portion and the bottom container portion trap the liquid of greater density in the lower chamber during normal dispensation of the liquid of lesser density from the upper chamber.

5. A method according to claim 4 wherein the angle is in the range of from about 5 to about 15°.

6. A method according to claim 5 wherein at least a portion of the container is sufficiently transparent to permit inspection of the color of the liquid contents just above and just below the separator.

7. A method according to claim 1 wherein the separator comprises a baffle having a perimeter, the baffle being sealably attached along at least a substantial portion of the perimeter to one or more substantially vertical interior surfaces of the container.

8. A method according to claim 6 wherein the baffle is substantially flat and disposed at an angle from horizontal and further comprises an upper baffle portion and a lower baffle portion, the lower baffle portion at least in part defining a passageway between the chambers for liquid communication between the chambers, and wherein the upper baffle portion and the bottom container portion trap the liquid of greater density in the lower chamber during normal dispensation of the liquid of lesser density from the upper chamber.

9. A container adapted to separate and selectively dispense two liquids of different densities, the container comprising
   (a) a top container portion defining at least one aperture through which liquid may flow,
   (b) a bottom container portion,
   (c) a phase separator between the top container portion and the bottom container portion, the separator and the top container portion defining an upper liquid chamber, the separator and the bottom container portion defining a lower liquid chamber, the chambers being in liquid communication with one another, and
   (d) a conduit extending from the lower chamber to an exterior of the container above the top container portion thereby placing the lower chamber in liquid communication with the exterior of the container so that, when the container is positioned for dispensation of liquid through the aperture, the liquid of greater density of said two liquids is substantially trapped within the lower chamber to permit concurrent separation of the two liquids and dispensation of either the liquid of lesser density from the upper chamber or the liquid of greater density from the lower chamber.

10. A container according to claim 9 wherein the conduit comprises a hollow tube integral with or attached to the container, one end of the tube extending outside of the container and including a removable plug or cap for controlling the flow of liquid from the lower chamber through the tube.

11. A container according to claim 9 wherein the separator comprises a baffle having a perimeter, the baffle being sealably attached along at least a substantial portion of the perimeter to one or more substantially vertical interior surfaces of the container.

12. A container according to claim 11 wherein the baffle is disposed at an angle from horizontal and further comprises an upper baffle portion and a lower baffle portion, the lower baffle portion at least in part defining a passageway between the chambers for liquid communication between the chambers, and wherein the upper baffle portion and the bottom container portion trap the liquid of greater density in the lower chamber during normal dispensation of the liquid of lesser density from the upper chamber.

13. A container according to claim 12 wherein the angle is in the range of from about 5° to about 15°.

14. A container according to claim 9 wherein at least a portion of the container is sufficiently transparent to permit inspection of the color of the liquid contents just above and just below the separator.

15. A container according to claim 9 wherein the conduit comprises a hollow tube integral with or attached to the container, one end of the tube extending outside of the container and including a removable plug or cap for controlling the flow of liquid from the lower chamber through the tube, and wherein the separator comprises a baffle having a perimeter, the baffle being sealably attached along at least a substantial portion of the perimeter to one or more substantially vertical interior surfaces of the container.

16. A container according to claim 15 wherein the baffle is substantially flat and disposed at an angle from horizontal and further comprises an upper baffle portion and a lower baffle portion, the lower baffle portion at least in part defining a passageway between the chambers for liquid communication between the chambers, and wherein the upper baffle portion and the bottom container portion trap the liquid of greater density in the lower chamber during normal dispensation of the liquid of lesser density from the upper chamber.

17. A container according to claim 16 wherein the angle is in the range of from about 5° to about 15°.

18. A container according to claim 9 wherein the separator comprises a baffle having a perimeter, the baffle being sealably attached along at least a substantial portion of the perimeter to one or more substantially vertical interior surfaces of the container, and wherein the baffle is substantially flat and disposed at an angle from horizontal and further comprises an upper baffle portion and a lower baffle portion, the lower baffle portion at least in part defining a passageway between the chambers for liquid communication between the chambers, and wherein the upper baffle portion and the bottom container portion trap the liquid of greater density in the lower chamber during normal dispensation of the liquid of lesser density from the upper chamber.

19. A container according to claim 18 wherein the angle is in the range of from about 5° to about 15°.

20. A container according to claim 19 wherein at least a portion of the container is sufficiently transparent to permit inspection of the color of the liquid contents just above and just below the separator.

21. A container according to claim 20 wherein the conduit comprises a hollow tube integral with or attached to the container, one end of the tube extending outside of the container and including a removable plug or cap for controlling the flow of liquid from the lower chamber through the tube.

22. A container according to claim 9 further comprising a hollow shaft having a first portion which extends into the container and a second portion which has an outer diameter which is less than the diameter of the aperture, the shaft being adapted for sealable engagement with the container when extending through the aperture, whereby, when the shaft is disposed within the aperture and is in sealing engagement with the container, the shaft axially extends into the container by a distance sufficient, during dispensation of liquid from the container, to concurrently substantially block the flow of the liquid of greater density through the aperture while permitting the flow of the liquid of lesser density through the aperture.

23. A container according to claim 22 wherein the distance by which the first portion axially extends into the container when the shaft is disposed within the aperture and is in sealing engagement with the container is in the range of from about 1 to about 3 inches.

24. A container according to claim 9 wherein the conduit extends through the upper chamber.

25. A container according to claim 24 wherein the conduit comprises a hollow tube integral with or attached to the container, one end of the tube extending outside of the container and including a removable plug or cap for controlling the flow of liquid from the lower chamber through the tube, and wherein the separator comprises a baffle having a perimeter, the baffle being sealably attached along at least a substantial portion of the perimeter to one or more substantially vertical interior surfaces of the container.

26. A container according to claim 25 wherein the baffle is substantially flat and disposed at an angle from horizontal and further comprises an upper baffle portion and a lower baffle portion, the lower baffle portion at least in part defining a passageway between the chambers for liquid communication between the chambers, and wherein the upper baffle portion and the bottom container portion trap the liquid of greater density in the lower chamber during normal dispensation of the liquid of lesser density from the upper chamber.

\* \* \* \* \*